United States Patent [19]
Shand

[11] Patent Number: 6,108,734
[45] Date of Patent: Aug. 22, 2000

[54] METHOD AND APPARATUS FOR A RELAXED BUS PROTOCOL USING HEURISTICS AND HIGHER LEVEL SUPERVISION

[75] Inventor: Mark Alexander Shand, Dampierre-en Yvelines, France

[73] Assignee: Digital Equipment Corporation, Maynard, Mass.

[21] Appl. No.: 08/982,080

[22] Filed: Dec. 1, 1997

[51] Int. Cl.[7] ........................................... G06F 13/00
[52] U.S. Cl. .................. 710/105; 710/130; 710/35; 714/48
[58] Field of Search ........................... 710/130, 105, 710/35, 22; 709/200, 232; 370/428, 912; 714/47, 48

[56] References Cited

U.S. PATENT DOCUMENTS

| | | | |
|---|---|---|---|
| 4,115,854 | 9/1978 | Capowski et al. | 710/130 |
| 5,263,151 | 11/1993 | Ikeno | 714/815 |
| 5,701,301 | 12/1997 | Weisser, Jr. | 370/428 |

*Primary Examiner*—Gopal C. Ray
*Attorney, Agent, or Firm*—Pennie & Edmonds LLP; Michael A. Rodriguez

[57] ABSTRACT

In a relaxed bus protocol for transferring bursts of data from a slow device to another device, a predictor generates an advance signal. The advance signal is used to load next data into an output register of the slow device, the next data can then be transferred to the other device. A validator/corrector receiving a ready signal from the second device, the validator/corrector determines that the advance signal is correctly generated by the predictor. Heuristics and a higher level protocol adjust the size and frequency of the bursts of data to achieve optimal performance, and maintain correctness of transmitted data.

11 Claims, 3 Drawing Sheets

METHOD AND APPARATUS FOR A RELAXED BUS PROTOCOL USING HEURISTICS AND HIGHER LEVEL SUPERVISION

FIELD OF THE INVENTION

This invention relates generally to protocols used on buses connecting computing devices, and more particularly to buses connecting devices operating at substantially different speeds.

BACKGROUND OF THE INVENTION

FIG. 1 shows a first device (SLOW-DEVICE) 110 connected to a second device (OTHER-DEVICE) 120 by bus lines 131–133. Bus lines 131–132 carry control signals (READY) between the devices, and line 133 carries data signals from device 110 to device 120. In other words, device 110 is a source of data, and device 120 is a consumer of data. In addition, bus lines can also carry timing signals in any number of well known ways. The timing signals are typically generated from clock cycles.

The bus lines 131–133 use, for example, the well known industry standard PCI protocol. As a characteristic, the PCI bus applies an aggressive setup and clock-to-out requirements on its protocol control signals. This makes it difficult for relatively slow devices to process control signals received from a device operating at a substantially different rate. An example device is implemented using slow circuit technologies such a field programmable gate array (FPGA).

In particular, during target memory read and master memory write operations that have multiple data phases, i.e., "bursts," the slow devices 110 will have a difficult time processing bus control signals in a manner that allows the slow device to reliably decide whether or not the other device is ready to receive a next data phase on each successive clock cycle.

Consider FIG. 1. The key difficulty is processing the bus control signals (READY) 131–132 respectively generated by the slow and other device. An ADVANCE signal 111 to a multiplexer 115 is used to decide whether an output register 112 can be loaded with next data 113, e.g., both devices must be ready.

In order to produce the ADVANCE signal 111 correctly it must be determined whether or not the output register still contains current data 114. If the other device 120 did not accept the current data 114, then the current data must be retained in the output register 112.

However, if the slow device asserts READY 131 and the other device 120 accept the data, then the next data 113 must be loaded into the output register 112 so that the data can be found on the data line 133. In this case, the other device 120 can accept the data on the next clock cycle.

The standard PCI bus protocol commits each data phase on the cycle that data, e.g., a 32 or 64 bit word, is transferred onto the bus. However, many cohesive data transfers use larger bursts of words, for example, network packets, or disk blocks. Here, the data is only meaningful when the entire burst has been transferred.

Previous approaches rely on maintaining a rigorous correctness at the bus protocol level in the slow device. The slow device cannot permit itself to guess what the receiver's response will be. Wrong guesses will lead to incorrect data transfers with no higher level mechanism for detecting or correcting such incorrect transfers.

Therefore, in the prior art, slow devices introduce wait states on the bus in the form of a delay cycle every clock cycle. That is the slow device waits one complete extra clock cycle on every cycle that transfers data so the ready decisions will always be correct. Introducing wait states on the bus disrupts the flow of bursts of data and reduces bus bandwidth. Performance is compromised. Implementing the slow device in faster circuit technology compromises cost, neither solution is satisfactory.

Therefore, it is desired to achieve maximum or close to maximum speed data transfers for bursts of data from a slow device without any delays or wait states.

SUMMARY OF THE INVENTION

The invention provides a relaxed bus protocol for optimally transferring data from one device to another. A predictor of a first device generates an advance signal. The advance signal is used to load next data into an output register of the first device. The next data can then be transferred to the second device.

A validator/corrector receives a ready signal from the second device. The validator/corrector determines that the advance signal is correctly generated by the predictor. If the advance signal is generated incorrectly, the rate at which the predictor generates the advance signal can be adjusted using heuristics and a higher level protocol in a supervisory hardware circuit or a software device driver supplying data for the first device.

DETAILED DESCRIPTION OF A PREFERRED EMBODIMENT

Figure 2:
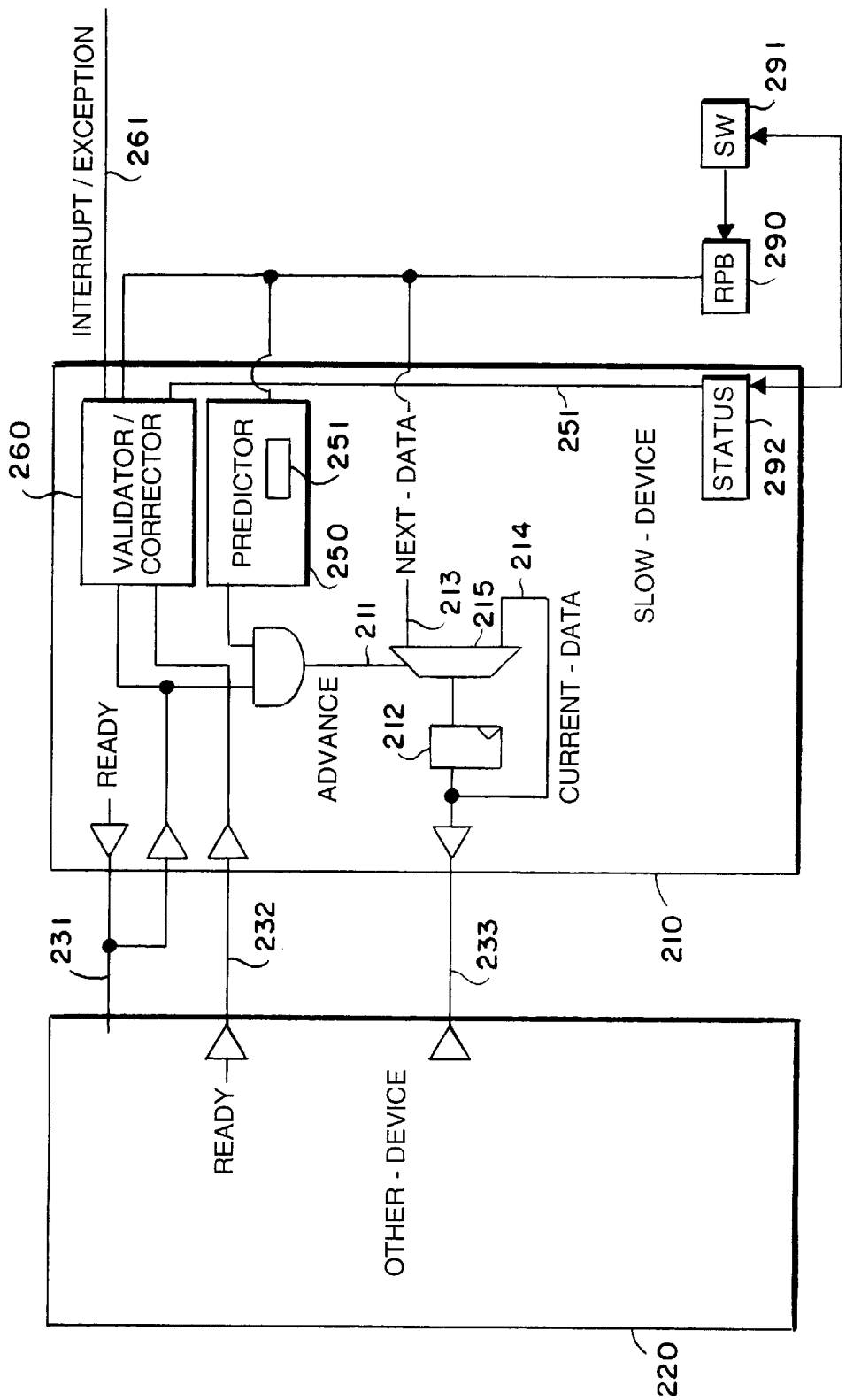
FIG. 2 is a block diagram of two devices connected by a bus using a protocol according to the invention.

FIG. 2 shows a computing device (SLOW-DEVICE) 210 with a relaxed bus protocol for transferring data according to the invention. The relaxed bus protocol uses heuristics and higher level supervision to maintain close to optimal data transfer rates to another device (OTHER-DEVICE) 220. As an advantage, the device 210 can be implemented using relatively slow circuit technology, for example, as a FPGA.

The invention allows data transfers to proceed from the slow device 210 at nearly a full rate. This rate is achieved in the face of imperfect or untimely knowledge of the operation of the other device 220. The relaxed protocol tolerates occasional incorrect operation, and relies on the heuristics and higher level protocols to correct any erroneous transfers resulting from incorrect guesses.

As shown in FIG. 2, the devices 210 and 220 are connected by lines 231–232 carrying control signals (READY), and line 233 carrying data signals. Current data 214 being transferred are stored in an output register 212, and next data are supplied on line 213. The next data 213 can be supplied by a replay buffer 290. A multiplexer 215 selects either next data 213 or current data 214 using an advance (ADVANCE) signal 211.

Figure 1:
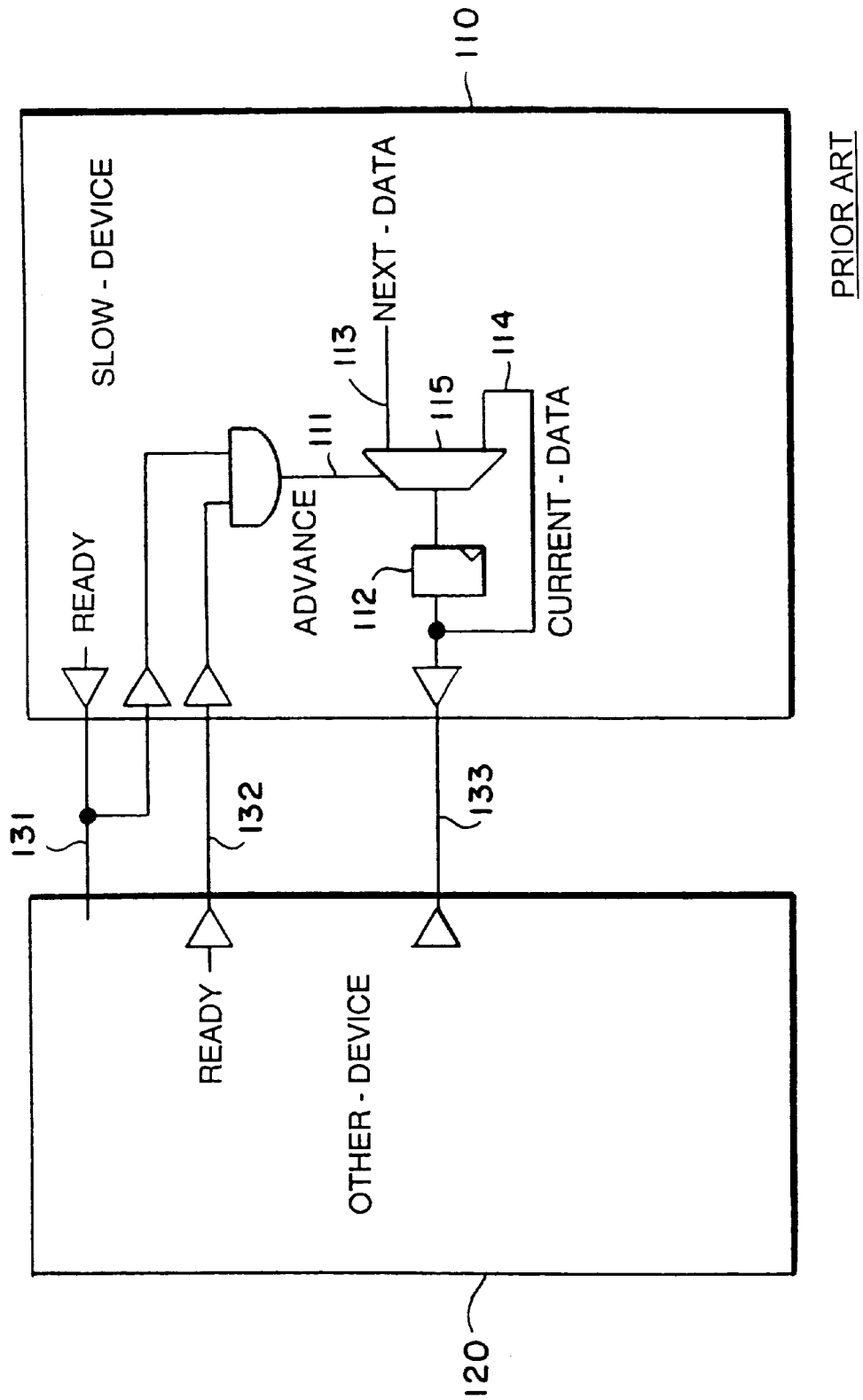
FIG. 1 is a block diagram of two devices connected by a bus using a prior art protocol.

Here, the advance signal 211 is generated by a predictor 250 and a validator/corrector 260, in contrast with the advance signal 111 generated by the ready signals 131–132 in FIG. 1. The predictor 250 generates the advance signal 211 on a "guess" or prediction when the other device 220 will assert its ready signal on line 232.

The predictor 250 can include one or more registers 251. In one implementation, the registers 251 can count the maximum number of data units bits, bytes or words) that can be transferred as a burst to the other device on successive clock cycles without an error. In addition, the registers 251 can count the minimum number of cycles to wait between successive bursts. Alternatively, the registers 251 can be implemented as shift registers. In this case, a bit pattern in the shift registers indicates on which clock cycle data can be sent, or not, for example, a sequence of bits "1111111111111100" would indicate bursts of fourteen data units, followed by two wait cycles.

The real ready signal 232 from the other device 220 is supplied to the validator/corrector 260. The validator/predictor 260 when necessary can initiate corrective action on subsequent clock cycles. Corrective action can include resending, and adjusting the length of the data bursts and the delay between the bursts.

The invention can operate in several modes. For instance, the slow device can aggressively assume that the other device 220 always operates at a maximum possible rate, and generate the advance signal accordingly. The predictor 250 can be adjusted if the maximum rate is not attainable.

Alternatively, the slow device 210 can adaptively learn the response pattern of the other device 220 and adjust the output of the predictor on the assumption that the other device 220 will continue the same pattern of operation.

For example, the slow device 210 can delay the transfer of a burst of data as determined by a higher level protocol when it is probably certain that the data will not be accepted by the other device 220. With each data phase, the slow device 210 predicts the likely response to the current cycle. In case of a wrong prediction, operations in subsequent cycles can be adjusted to achieve a correct sequence of transfers that are committed at the bus level. Incorrect transfer can be corrected by the higher level protocol.

Various high level protocols can be used. In one embodiment, the replay buffer 290, or software 291 controlling the buffer 290 can read (poll) a status word 292 before committing a burst of data, e.g., a packet or block. If the status word 292 indicates that a burst transfer did not proceed correctly, then the buffer can recommence the transfer from the point of failure. For example, the polling can be before each packet or block of the higher level protocol is committed. Alternatively, if wrong predictions are relatively infrequent, then they may be signaled by an asynchronous interrupt signal or exception condition on line 261.

In another embodiment the correction process can be entirely hardware based by using a supervisory circuit that is part of the corrector 260. The supervisory circuit initiates replay of transfers automatically when incorrect predictions are detected by the validator. The supervisory circuit inhibits the commit at the end of each packet or block of the higher level protocol until all data have been correctly transferred. If the mechanism for commit is hardware based, then it need not used the relaxed protocol. Instead it can use prior art methods so that the commit does not rely on the predictor. Since a block or packet of the higher level protocol normally contains many words and the commit just one word most of the performance advantages of the relaxed protocol are still achieved.

Figure 3:
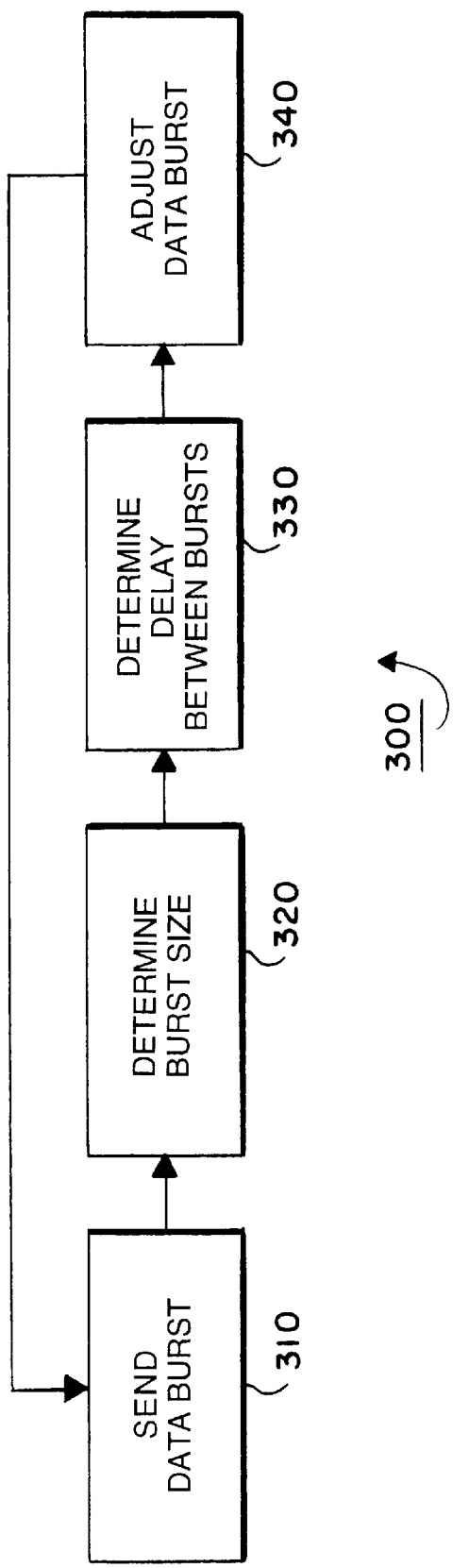
FIG. 3 is a flow diagram of a process for adjusting a rate at which data are sent.

FIG. 3 shows a flow diagram of a process 300 for heuristically adjusting the size and rate at which data bursts are sent from the slow device 210 to the other device 220. In step 310 a burst of data of a predetermined size is sent from the slow device 210 to the other device 220. If the burst is received without error, the size can be increased, otherwise it can be decreased in step 320. Step 330 determines the optimal delay between bursts, and step 340 adjusts the predictor 250 to send data bursts having the optimal size and delay between bursts.

Previous approaches have relied on maintaining a rigorous correctness at the bus protocol level, and generally do not permit "guesses." Instead, if they know a priori that they cannot process ready signals fast enough they introduce wait states.

It is understood that the above-described embodiments are simply illustrative of the principles of the invention. Various other modifications and changes may be made by those skilled in the art which will embody the principles of the invention and fall within the spirit and scope thereof.

I claim:

1. An apparatus for relaxing a bus protocol, the bus protocol for transferring bursts of data from a first device to a second device, comprising:

a predictor generating an advance signal, the advance signal to load next data into an output register of the first device, the next data to be transferred to the second device; and a validator/corrector receiving a ready signal from the second device, the validator/corrector to determine that the advance signal is correctly generated by the predictor.

2. The apparatus of claim 1 wherein the validator/corrector adjusts the generation of the advance signal according to a pattern of ready signals received.

3. The apparatus of claim 1 wherein the validator/corrector generates an error condition when the advance signal is generated erroneously.

4. The apparatus of claim 3 wherein the error condition is an asynchronous interrupt signal.

5. The apparatus of claim 3 wherein the error condition is stored in a status register.

6. The apparatus of claim 3 wherein the error condition is an exception condition.

7. The apparatus of claim 3 wherein the error condition is processed by a higher level protocol to correct the erroneous transfer of the data.

8. The apparatus of claim 7 wherein the higher level protocol is implemented with a software device driver connected to the first device.

9. The apparatus of claim 7 wherein the higher level protocol uses a hardware circuit within the device.

10. The apparatus of claim 1 wherein the predictor includes a register for determining the length of the burst of data that can consistently be sent correctly to the second device.

11. A method for a relaxed bus protocol, the bus protocol for transferring data from a first device to a second device, comprising:

generating an advance signal in the first device, the advance signal to load next data into an output register of the first device, the next data to be transferred to the second device;

receiving a ready signal from the second device;

determining that the advance signal is correctly generated; and transferring the data from the first device to the second device when the advance signal is correctly generated.

* * * * *